United States Patent [19]

Winsor

[11] Patent Number: 5,302,063
[45] Date of Patent: Apr. 12, 1994

[54] VEHICLE WHEEL CHOCK

[75] Inventor: Robert B. Winsor, Montreal, Canada

[73] Assignee: Holden America Inc., Montreal, Canada

[21] Appl. No.: 843,122

[22] Filed: Feb. 28, 1992

[51] Int. Cl.$^5$ .............................................. P60T 3/00
[52] U.S. Cl. ........................................ 410/30; 410/49; 188/32
[58] Field of Search ................... 410/8, 9, 10, 19, 20, 410/21, 22, 26, 29, 30, 49, 50, 67, 74, 75; 188/4 R, 32, 36

[56] References Cited

U.S. PATENT DOCUMENTS

| 2,066,714 | 1/1937 | Butterworth | 410/21 X |
| 2,853,257 | 9/1958 | Cook | 188/32 |
| 2,858,905 | 11/1958 | Fahlard | 410/30 |
| 2,895,569 | 7/1959 | Nystrom | 410/30 X |
| 4,060,036 | 11/1977 | Palms . | |
| 4,343,401 | 8/1982 | Paulyson | 410/26 X |
| 4,399,893 | 8/1983 | Switzer | 410/10 X |
| 4,659,266 | 4/1987 | Theler et al. | 410/10 |
| 4,668,140 | 5/1987 | Blunden . | |
| 4,786,223 | 11/1988 | Crissy et al. . | |
| 4,804,070 | 2/1989 | Bohler . | |
| 4,836,726 | 6/1989 | Robertson et al. . | |
| 4,838,743 | 6/1989 | Blunden et al. . | |
| 4,875,813 | 10/1989 | Moyer et al. . | |
| 4,960,353 | 10/1990 | Thorndyke . | |
| 4,971,492 | 11/1990 | Moyer et al. . | |

FOREIGN PATENT DOCUMENTS

| 0128992 | 12/1984 | European Pat. Off. . | |
| 1265771 | 4/1968 | Fed. Rep. of Germany | 410/30 |
| 1810854 | 1/1973 | Fed. Rep. of Germany . | |
| 1564196 | 4/1969 | France . | |
| 2421768 | 11/1979 | France . | |
| 2584664 | 1/1987 | France . | |
| 1243985 | 7/1986 | U.S.S.R. | 410/19 |
| 359496 | 10/1931 | United Kingdom | 410/29 |

Primary Examiner—Michael S. Huppert
Assistant Examiner—Donald W. Underwood
Attorney, Agent, or Firm—Richard A. Speer

[57] ABSTRACT

A wheel chocking system for restraining road vehicles being transported on a vehicle support surface of a transport vehicle is disclosed. The support surface has a grating disposed in at least a wheel support area where one or more road vehicles are positioned. The grating is formed by a grid of rods to which is secured chock members at desired positions relative to the position of the wheels of the road vehicle positioned over the wheel support area. Each chock has a base with disengageable attachment members in a lower engaging surface thereof to immovably secure the chock to the grating. The chock has an angled face plate which is positioned relative to an outer tread surface of a tire of a wheel to restrain movement thereof. Load transmitting members transfer a load applied to the face plate onto the base member and into the grating secured to the support surface. A lateral restraining member is provided on a side of the face plate and disposed adjacent an inner side wall portion of the tire to prevent lateral shifting of the vehicle positioned on the support surface.

15 Claims, 12 Drawing Sheets

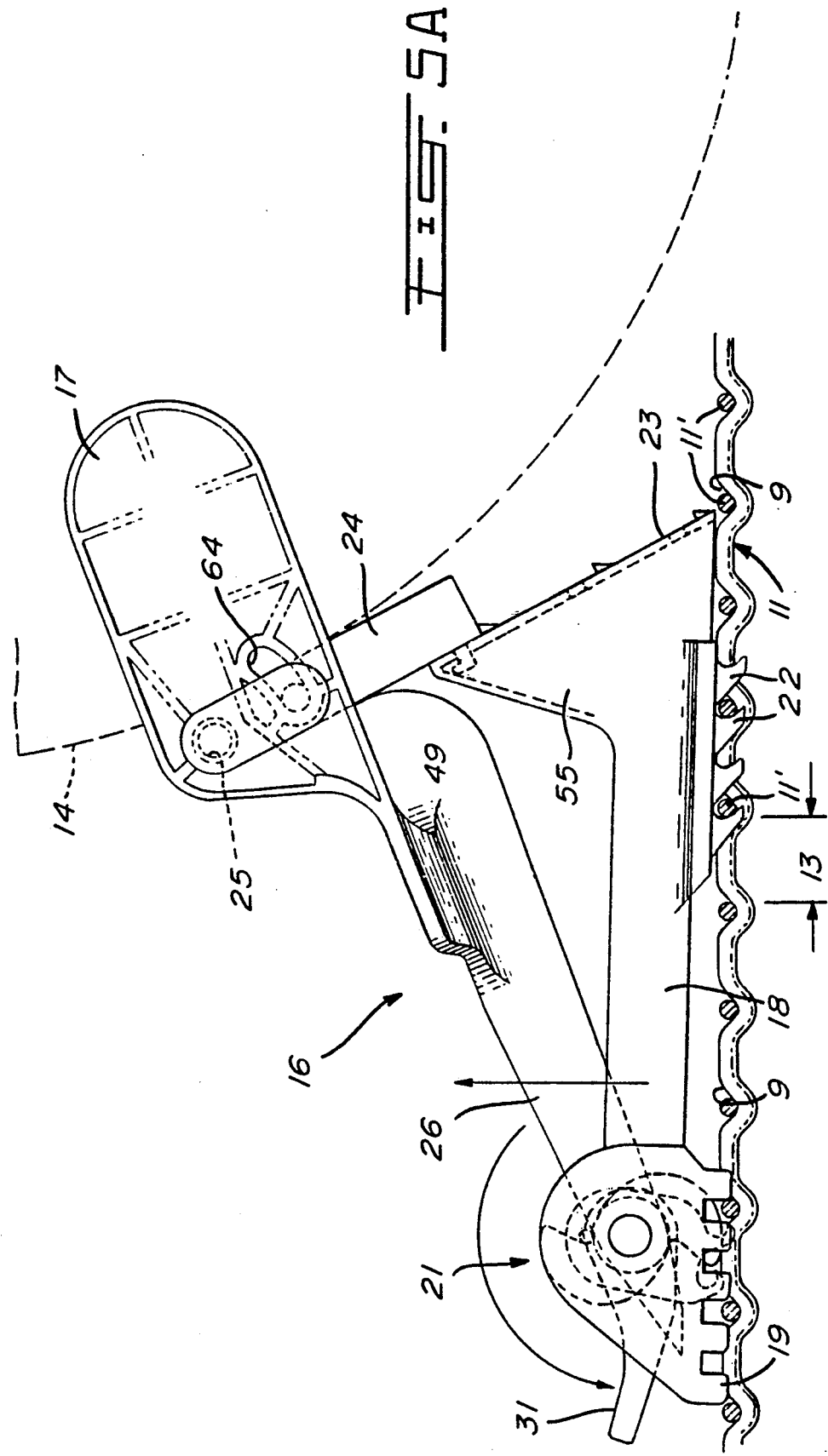

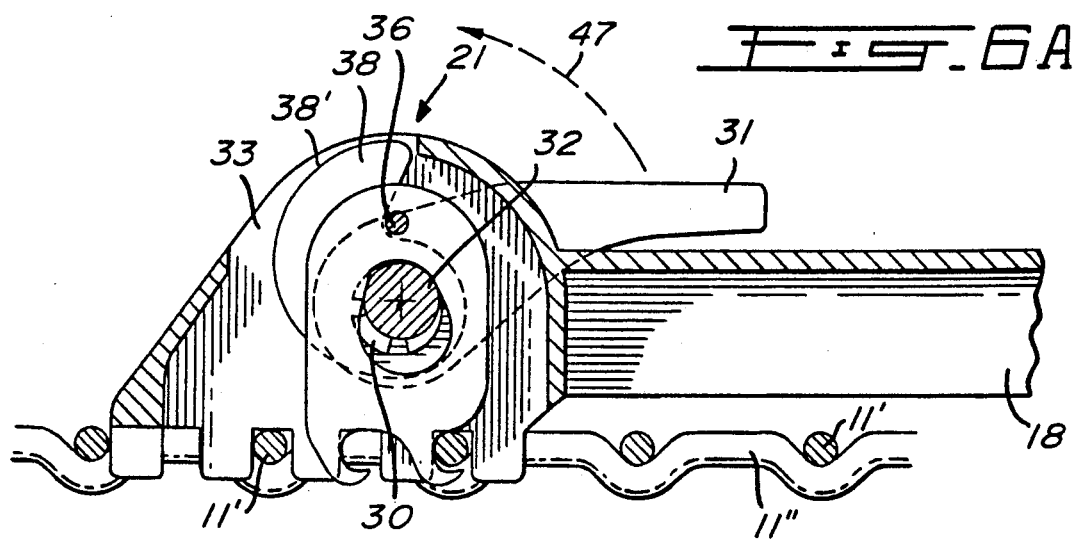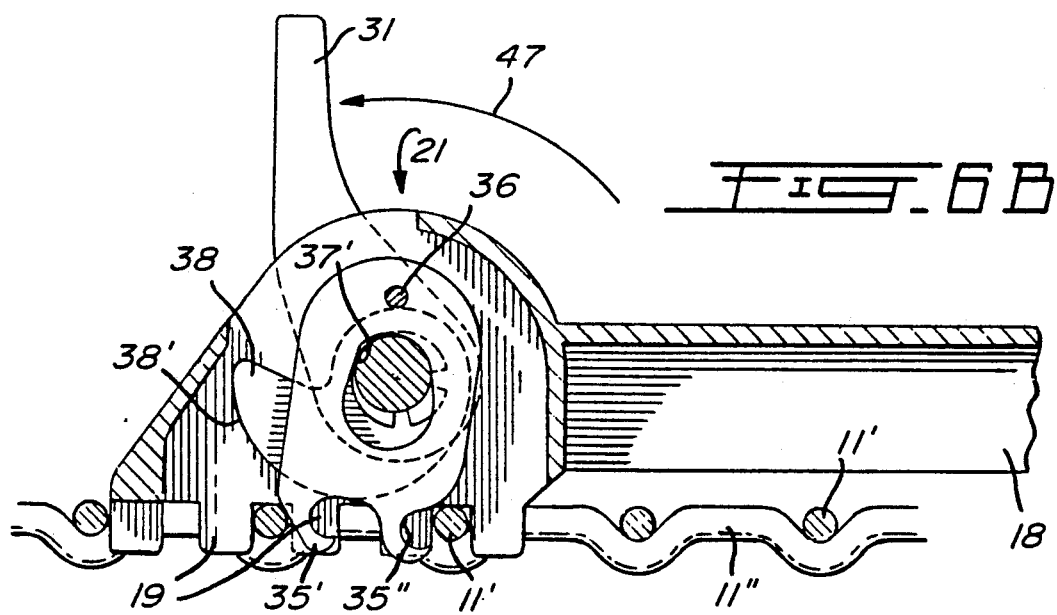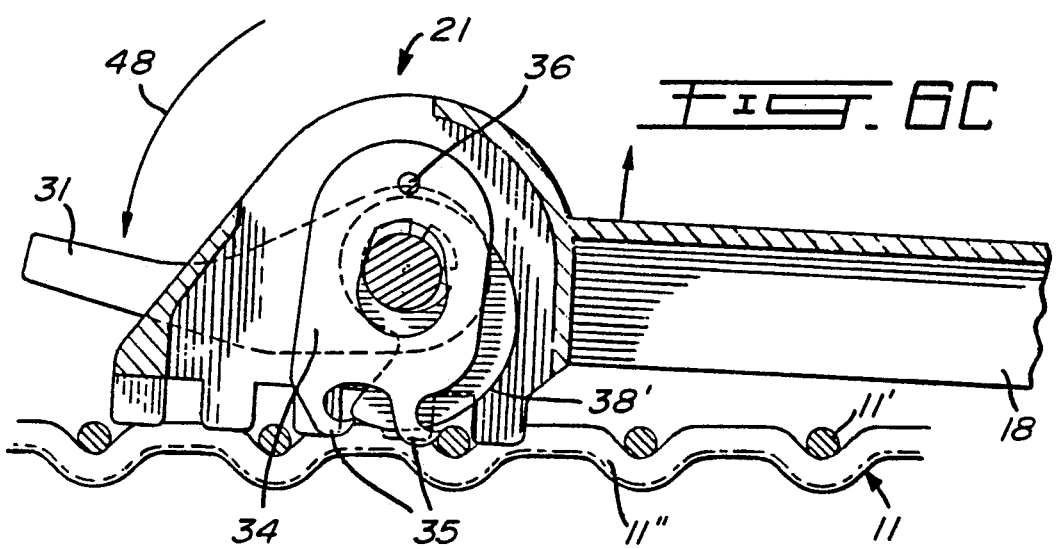

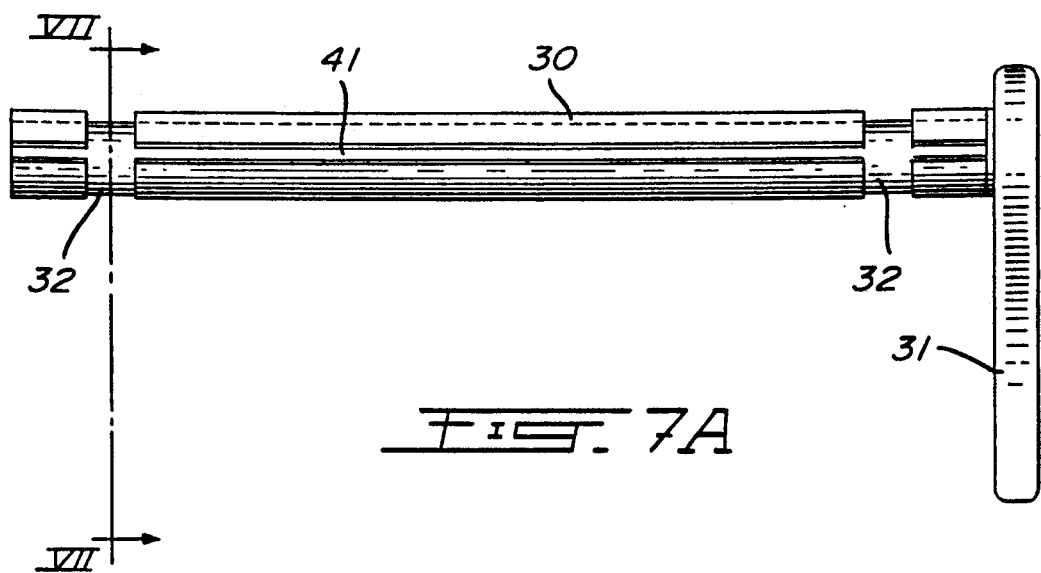
FIG. 7A
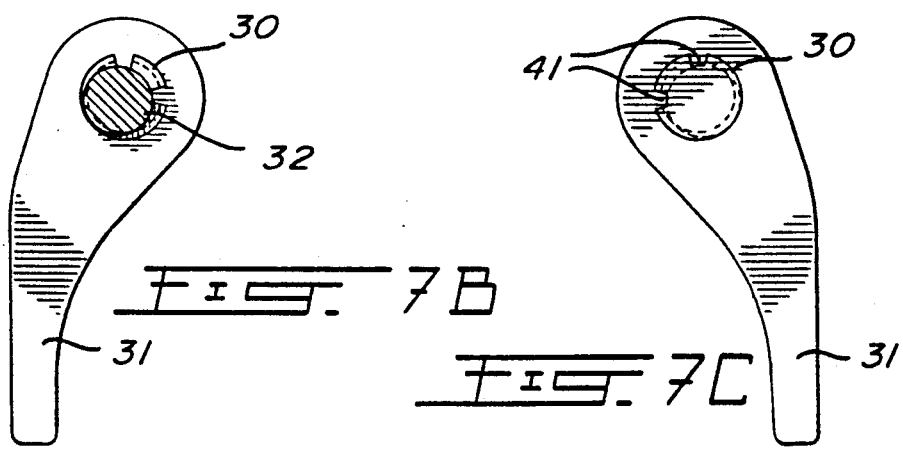
FIG. 7B
FIG. 7C
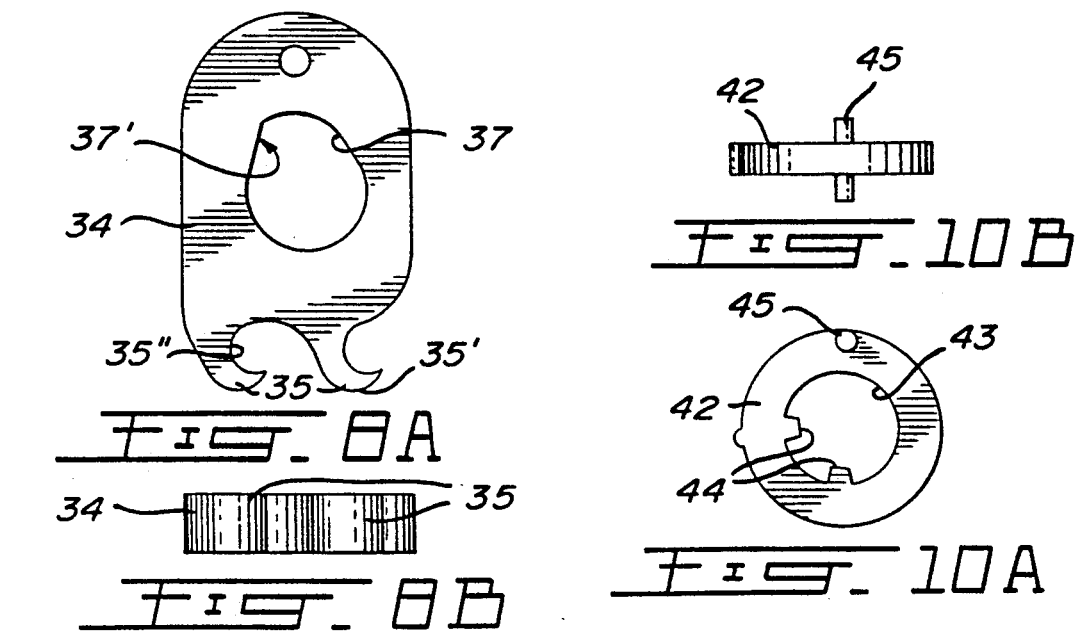
FIG. 8A
FIG. 8B
FIG. 10B
FIG. 10A

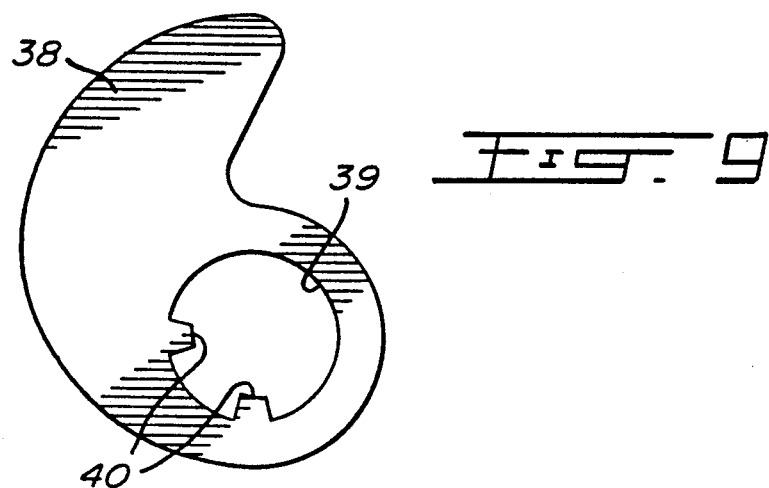
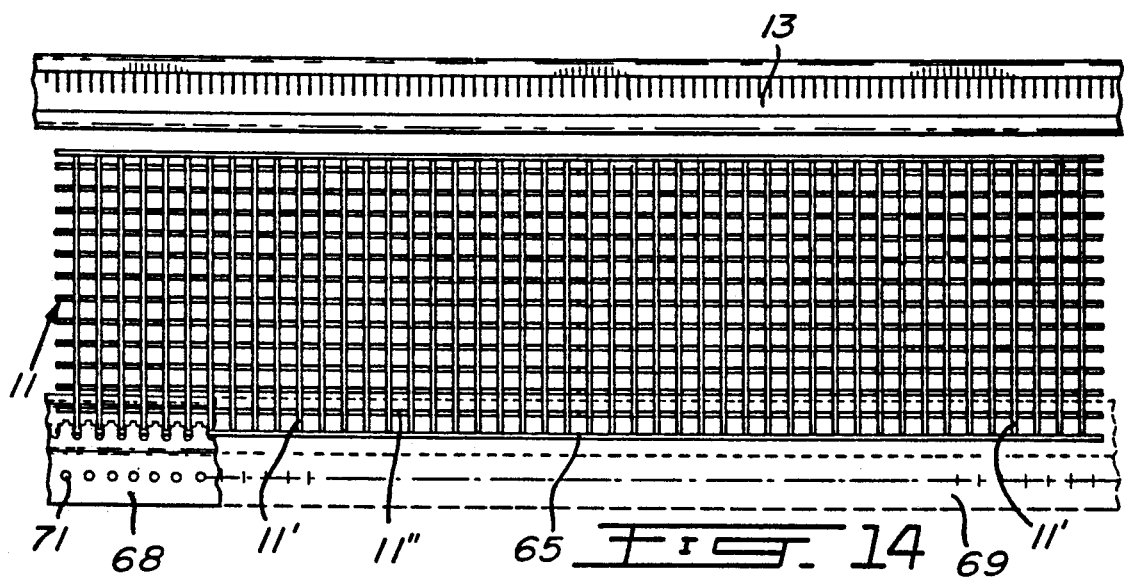
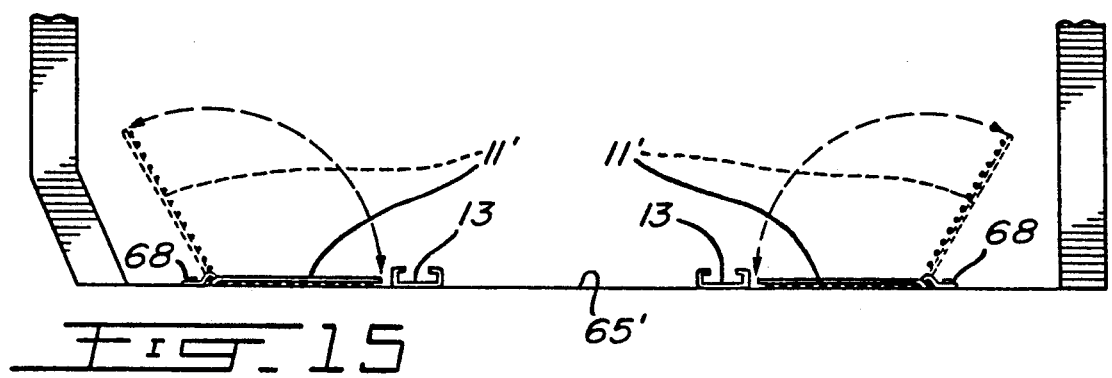

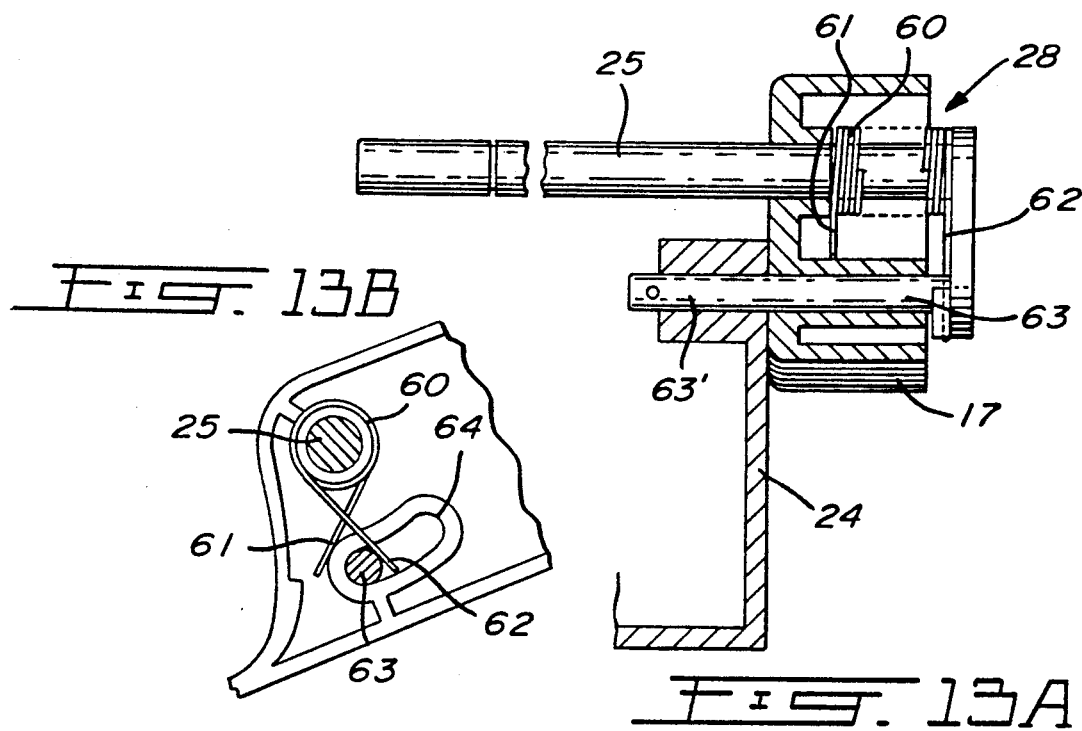
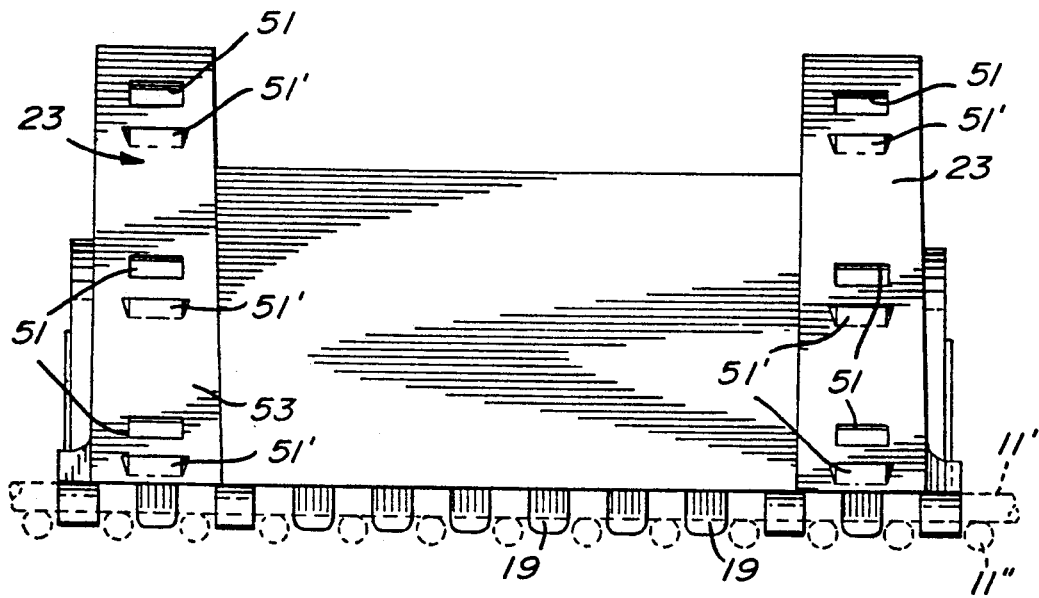
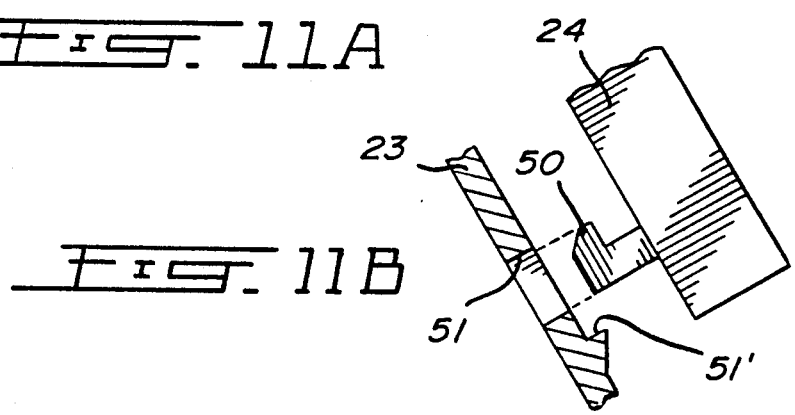

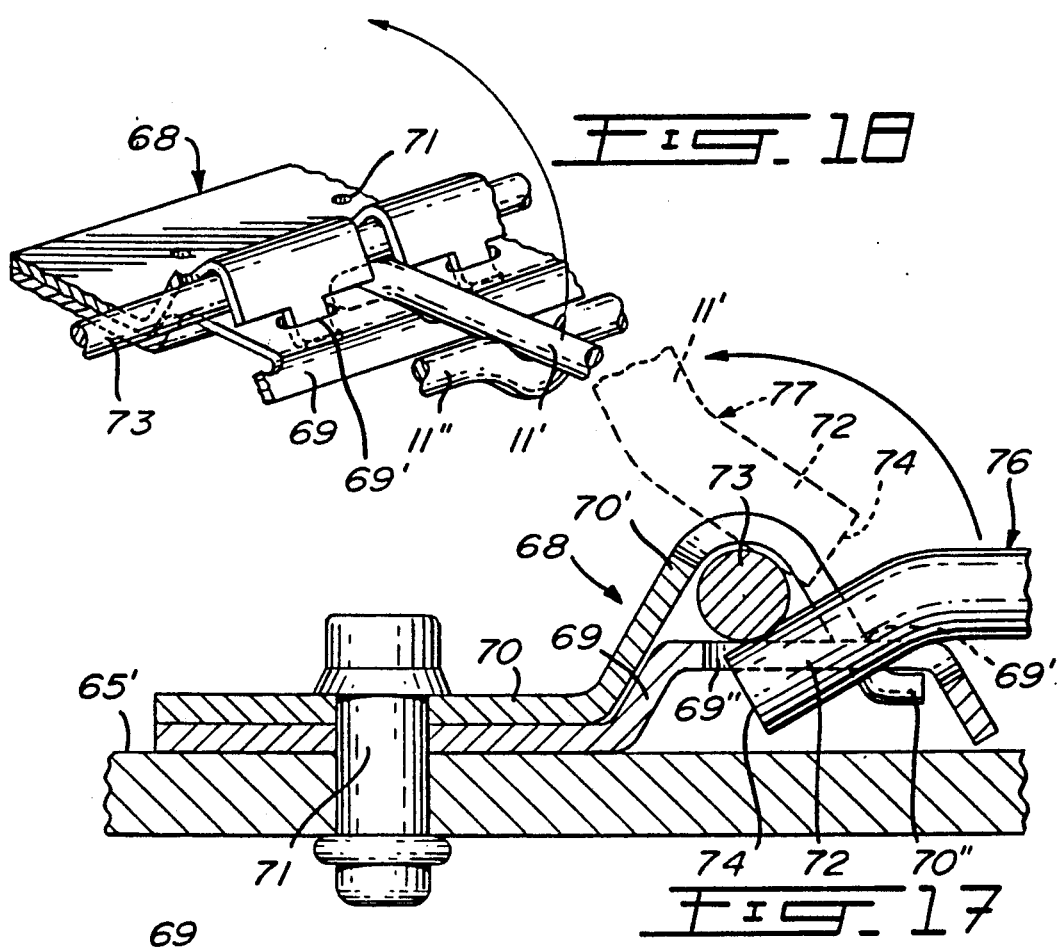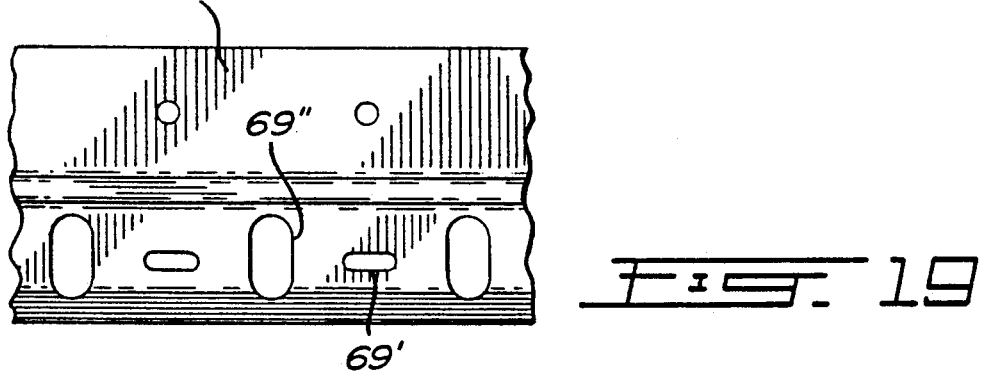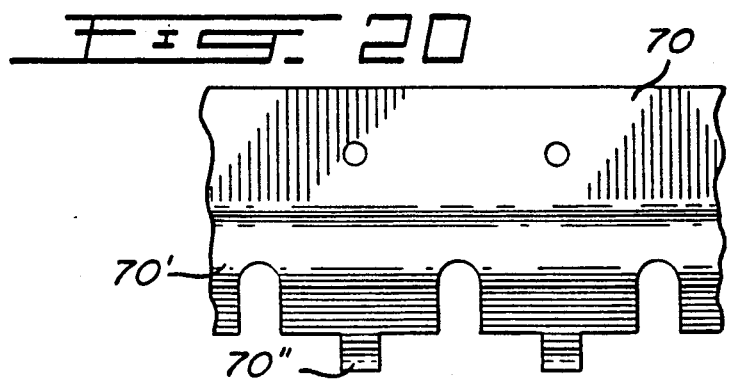

VEHICLE WHEEL CHOCK

BACKGROUND OF THE INVENTION

1. Field of the Invention

The present invention relates to a wheel chocking system for arresting road vehicles transported on flatbeds or other similar transport vehicles. More particularly, the present invention relates to a device having a plurality of chock members detachably secured to a grating provided on a support surface of the vehicle at defined locations. The chock comprises an angled face plate for alignment with a tire of an associated wheel of the vehicle positioned on the grating, restraining movement thereof. A load transmitting member transfers the load applied to the face plate onto the grating and a paddle-shaped restraining member prevents lateral shifting of the vehicle.

2. Description of the Prior Art

Various anchoring systems are known for securing road vehicles transported on flatbed-type transport vehicles to prevent shifting of those vehicles during transportation. The most common system is to "tie down" the vehicle using chains connected to steel runners in the support surface, e.g., the floor of a railway flatbed vehicle. A ratchet tool is required in order to secure these chains taut. In an attempt to resolve some of the difficulties in the installation of such anchoring systems, other wheel chocking assemblies have been developed, including, e.g., those disclosed in U.S. Pat. Nos. 4,659,266 and 4,668,140. However, although these systems can be installed more rapidly onto a rail system provided on the support surface of the flatbed, they utilize winch mechanisms and harnesses which must be fitted over the vehicle tires to restrain movement of the vehicle.

Other disadvantages of the wheel chocking systems in the prior art is that they cannot be readily adapted to different axle spacing, to double-wheel axles, or to very small or large wheels and are extremely difficult to apply when the wheel openings in the vehicle side sheeting project downwardly close to or below the level of the top of the tire. Known chock systems can also become jammed between the vehicle tire and the floor due to vehicle shifting during transport, requiring movement of the vehicle prior to removal of the chock.

OBJECTS OF THE INVENTION

Accordingly, it is an object of the present invention to provide a wheel chocking system for restraining road vehicles transported on flat-bed surfaces of transport vehicles which substantially overcomes all of the above-mentioned disadvantages of the prior art.

Another object of the present invention is to provide a wheel chocking system which further utilizes at least four chocks associated with at least four wheels of a vehicle being transported to provide a balanced restraint relative to the center of gravity of the vehicle and eliminate the effects of lateral forces, induced by longitudinal forces or caused by rocking of the transport vehicle, and inherent to chocking systems of the prior art wherein only the wheels on one side of a vehicle are restrained.

A further object of the present invention is to provide a wheel chocking system wherein the chock is provided with an angled face plate vertically adjustable to provide effective chocking restraint for all tire sizes commonly encountered.

An additional object of the present invention is to provide a wheel chocking system wherein the chocks are provided with a paddle-shaped member extending laterally to the vehicle tire which is adjustable vertically to provide lateral restraint at an appropriate height on the tire of the vehicle being transported.

Still another object of the present invention is to provide a wheel chocking system wherein the chock system does not require restraining straps or harnesses due to its vertical adjustability and lateral restraint capability.

A further object of the present invention is to provide a wheel chocking system wherein the chocks are easy to install at virtually any desired location on a grating disposed on a support surface of a transport vehicle and which requires no tools for its installation or removal.

An additional object of the present invention is to provide a wheel chocking system wherein the chocks are constructed of lightweight material and are easy to manually transport and store.

A further object of the present invention is to provide a wheel chocking system wherein the grating provided on the support surface is hinged to provide convenience in cleaning and snow or debris removal.

These and other objects and advantages of the present invention may be determined by a review and understanding of the following disclosure and appended claims.

SUMMARY OF THE INVENTION

The present invention provides a wheel chocking system for restraining road vehicles being transported on a support surface of a transport vehicle, having a grating disposed in at least a wheel support area, where one or more road vehicles can be positioned. The grating has a plurality of engageable arresting means to immovably secure at least four chock members thereto at a desired position relative to at least four wheels of the road vehicle to restrain the vehicle both laterally and longitudinally relative to the grating. Each chock member comprises a base member with disengageable locking means in a lower engaging surface thereof, the base member immovably securing the chock to the wheel support area adjacent a respective wheel of the four wheels of the road vehicle. The chock has a face plate directed to the tread surface of a tire of its associated wheel to longitudinally restrain the vehicle. A load transmitting means transfers a load applied to the face plate onto the base member and the grating secured to the support surface. A lateral restraining means is further extendingly secured to the chock and is disposed adjacent a side wall portion of the tire to prevent lateral shifting of the tire, associated wheel and vehicle positioned on the support surface.

BRIEF DESCRIPTION OF THE DRAWINGS

A preferred embodiment of the present invention will now be described with reference to the accompanying drawings, including:

FIGS. 5A and 5B are side views showing the chock of the wheel chocking system of the present invention in an engaged and disengaged state relative the floor grating, respectively;

FIGS. 6A through 6C are fragmented sectional views showing the construction and operation of the engageable arresting mechanism of the chock of the wheel chocking system of the present invention;

FIG. 7A is a bottom view of the manually actuated axially rotatable rod of the chock of the wheel chocking system of the present invention;

FIG. 7B is sectional view along section lines VII—VII of FIG. 7A;

FIG. 7C is an end view of FIG. 7A;

FIG. 8A is a plan view of the cam latch of the chock of the wheel chocking system of the present invention;

FIG. 8B is a top view of the cam latch of the chock of the wheel chocking system of the present invention;

FIG. 9 is a side view of the lifter cam of the chock of the wheel chocking system of the present invention;

FIG. 10A is a side view of the compressor disk of the chock of the wheel chocking system of the present invention;

FIG. 10B is a plan view of FIG. 10A;

FIG. 11A is the front view of the chock base of the chock of the wheel chocking system of the present invention, showing the construction of the load transfer wall;

FIG. 11B is an enlarged fragmented view showing the relationship between the stud, the cavities, and the support ledge;

FIGS. 13A and 13B are fragmented views showing the spring biasing arrangement of the face plate of the chock of the wheel chocking system of the present invention;

FIG. 14 is a top view showing how the grating of the wheel chocking system of the present invention is hinged to an outboard member of the support structure;

FIG. 15 is an end view showing how the grating of the wheel chocking system of the present invention is hingedly connected to an outboard member of the support structure;

FIG. 17 is a sectional view of the grating hinge connection of the grating of the wheel chocking system of the present invention;

FIG. 18 is a fragmented perspective view of the grating hinge connection of the grating of the wheel chocking system of the present invention to the support structure;

FIG. 19 is a plan view of the hinge base strip of the grating of the wheel chocking system of the present invention;

FIG. 20 is a plan view of the hinge keeper strip of the grating wheel chocking system of the present invention.

While some mechanical detail, including other plan and sectional views of the particular embodiment depicted, may have been omitted, such detail is not per se part of the present invention and is considered within the comprehension of those skilled in the art in light of the present disclosure. The resulting simplified presentation is believed to be more readable and informative and readily understandable by those skilled in the art. It should also be understood, of course, the invention is not limited to the particular embodiment illustrated.

DETAILED DESCRIPTION OF THE PREFERRED EMBODIMENT

Figure 1:
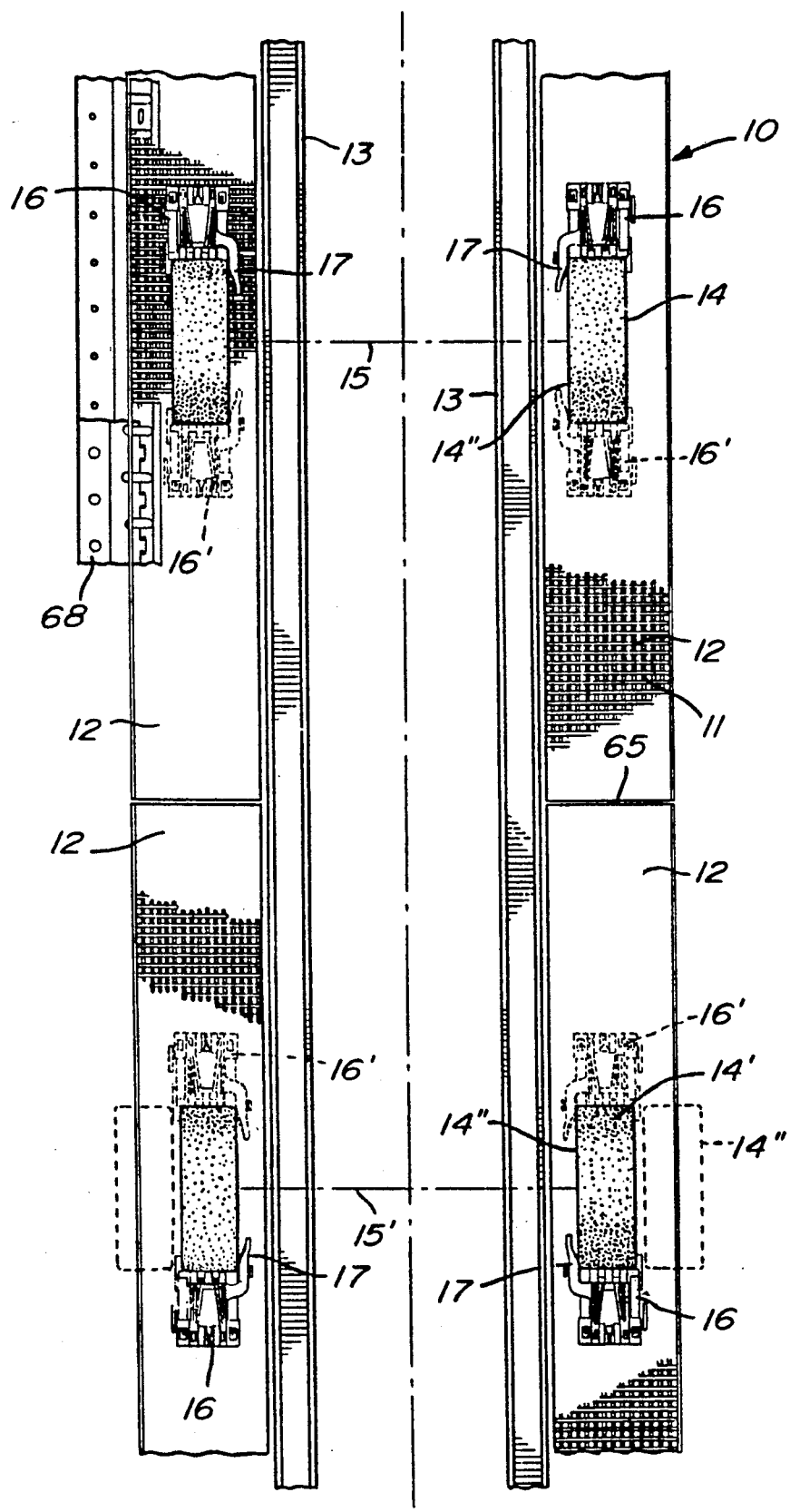
FIG. 1 is a fragmented plan view showing the wheel chocking system of the present invention, and particularly showing a support surface of the transport vehicle having grating disposed thereon to which chocks are secured relative to four sets of wheels of a ground vehicle being transported.

Referring now to the drawings, wherein like reference characters correspond to like structures throughout the drawings, and more particularly to FIG. 1, there is shown generally at 10 the wheel chocking system of the present invention for use in a transport vehicle. The system comprises a grating 11 formed of transversely welded circular steel rods, as will be described later, and arranged to form elongated rectangular deck grating sections 12 which are hingedly connected to elongated hinge connectors 68 positioned proximate the outboard side of the transport vehicle and parallel to channel members 13, the elongated hinge connectors 68 being secured to the transport vehicle deck structure. A vehicle (not shown) having at least two sets of wheels 14 and 14' secured to respective axles 15 and 15' is disposed on the grating 11, as illustrated in FIG. 1, with a wheel of each axle disposed on corresponding deck grating sections 12. The chock member 16 of the present invention is shown removably secured to the deck grating section 12 adjacent a tire of each of the four wheels 14 to restrain the vehicle on the deck grating section 12. The chock members 16 can be positioned in an arrangement as shown in FIG. 1 as a solid line, or as shown as 16' in phantom, or both sides of the wheels of axles 15, 15', or additional combinations as may be required to restrain vehicles of different weights from longitudinal and lateral shifting.

Each chock member 16 is provided with a detachable lock means, as will be described later, for securing the chock member 16 to engageable arresting means substantially defined by the openings 13 between the transversely welded rods of the grating 11. As herein shown, the chock members 16 are provided, in mirror image pairs, with lateral restraining means in the form of a paddle-shaped member 17 located on the leftward or rightward side of the chock member 16, such that the chock members 16 are connected to the grating with the paddle-shaped members 17 extending inwardly adjacent an inner side wall portion 14" of the tires of each wheel. As both sets of wheels thus are cooperatively restrained from lateral displacement in either direction, lateral shifting of the ground vehicle is prevented.

Figure 2:
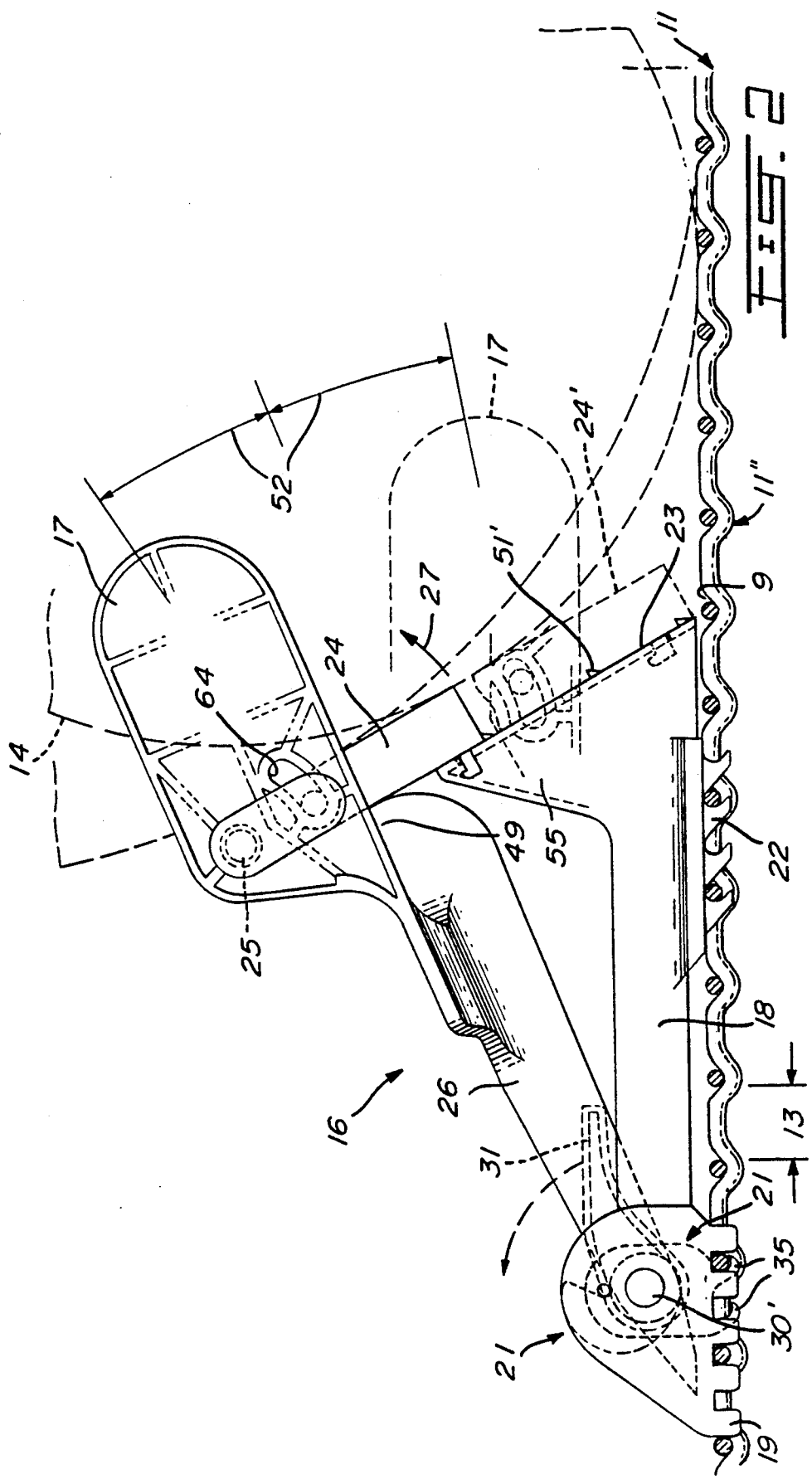
FIG. 2 is a side view of the chock of the wheel chocking system of the present invention wherein the chock angled face plate is in an extended position.
Figure 4:
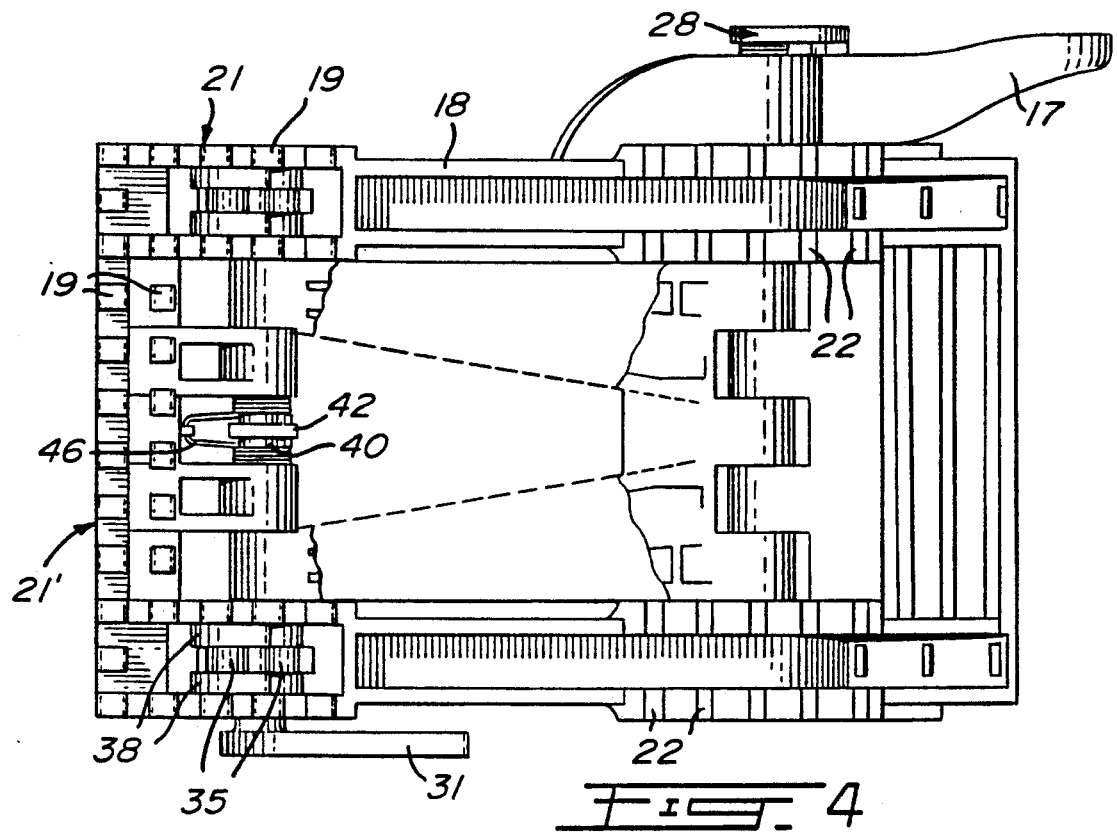
FIG. 4 is a bottom view of the chock of the wheel chocking system of the present invention shown in FIG. 2.

Referring now to FIGS. 2 through 5B, the construction of the chock member 16 may be understood. The chock member 16 is formed of plastic material and comprises a base 18 formed with structural ribs, with the base 18 having rows of transversely and longitudinally aligned arresting studs 19 depending therefrom. The studs 19 are arranged on opposed sides of a rear base area 21 in two parallel longitudinal rows of the rear edge 21' of the base 18, as shown in FIGS. 2 and 4. Transverse rows of studs 19 are also provided along the edges of rear base areas 21. The pairs of studs 19 fit into the openings 13 of the grating 11.

A series of clamping teeth 22 are provided along the front edge portion of the base 18, with two or three longitudinal rows on each side. These rows of teeth 22 are aligned transversely and longitudinally with the rows of arresting studs 19, as clearly shown in FIG. 4. The studs 19 and teeth 22 are configured to provide in pairs a close fit with in the rectangular openings 13 of the grating 11 to restrain the chock member 16 from moving relative to the deck sections 12. The teeth 22 are sloped forwardly to extend under the transverse rods 11' of the grating and to provide for chock member 16 removal even when trapped by a tire, as will be described later.

A load transfer wall 23 is formed integrally with the base 18 in a forward end thereof and is angled away from the wheel. A face plate 24 is hingedly secured by a hinge pin 25 connected to the forward top end of a load transfer member 26 and spring biased inwardly by a torsion spring assembly 28, as will be described later. The face plate 24 is engageable with the load transfer wall 23 and can be positioned at three (or more) distinct positions vertically thereof and movably retained along the angled plane of the load transfer wall 23. The face plate 24 can therefore be positioned to abut the tire tread of the wheels 14 at a height suitable to the wheel diameter.

Referring now to FIGS. 6A through 10B, there will be described the construction and operation of the detachable locking means a permitting the chock member 16 to be attached and detached from the decking 12. The detachable or disengagable locking means 9 is located in the rear portion 21 of the base 18, as can be more clearly seen in FIGS. 6A to 6C. As therein shown, the detachable locking means 9 is assembled on an axially rotatable rod 30, better shown in FIGS. 7A through 7C. The rod 30 has a manually actuated lever 31 secured to an end thereof, the rod 30 further having two cam portions 32. The axially rotatable rod 30 is supported in a circular bore formed across the rear support members 33 integrally molded within the base 18. Each of the disengageable attachment members, in the form of a cam latch 34, are transversely positioned about a respective cam portion 32. The cam latch 34 is a flat disc and has at least two spaced-apart hooking fingers 35 depending from a lower edge thereof and engageable with one adjacent top steel rod 11' of the grating 11. The cam latch 34 is hingedly secured by a hinge pin 36 in a top part thereof, the hinge pin 36 being secured to the rear support members 33. The cam latch 34 also has a cam engaging bore 37, as is better shown in FIG. 8A, and through which the cam portion 32 is positioned, as shown in the operational sequence depicted in FIGS. 6A through 6C.

As also shown in FIGS. 6A through 6C, FIG. 4 and FIG. 9, a lifter cam 38 is engaged by the axially rotatable rod 30 and positioned in pairs on each side of the cam latches 34. These lifter cams 38 are provided with a securing bore 39. Inwardly projecting keys 40 extend within the bore 39 and engage channels 41 formed in the rod 30, as shown in FIGS. 7A and 7C. These cam portions are provided to lift the rear portion 21 of the chock out of engagement with the transverse rods 11' provided in the grating 11, as will be described later.

Figure 3:
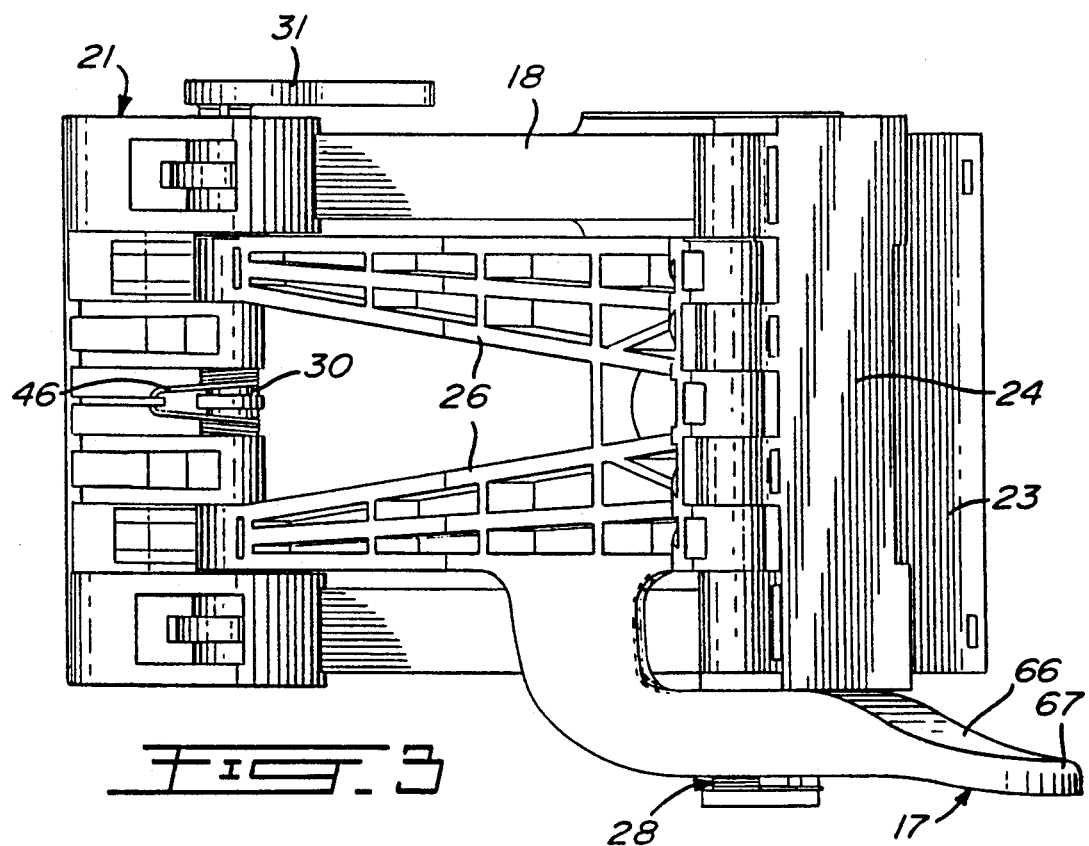
FIG. 3 is a top view of the chock of the wheel chocking system of the present invention shown in FIG. 2.
Figure 5B:
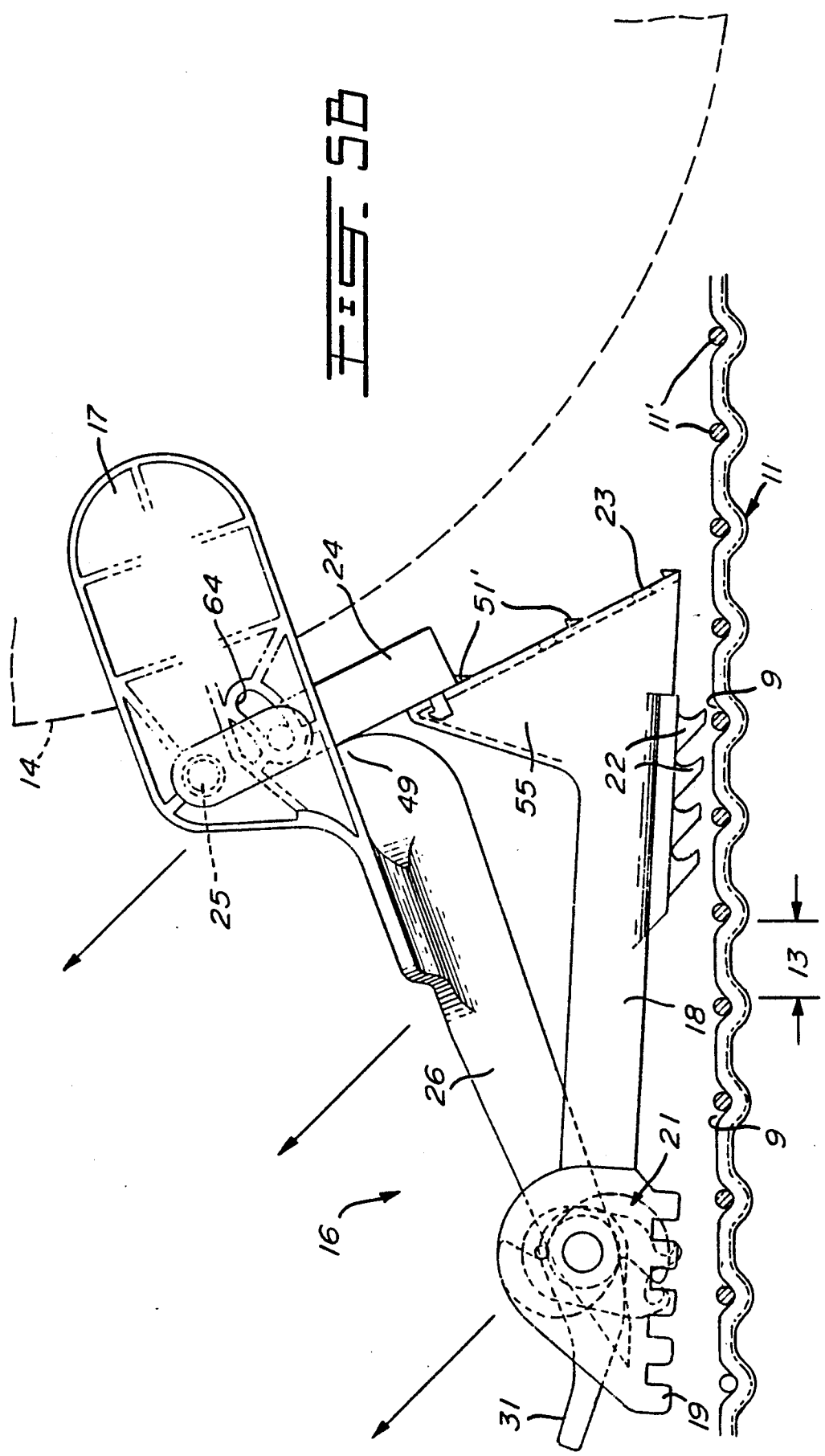
Figure 16A:
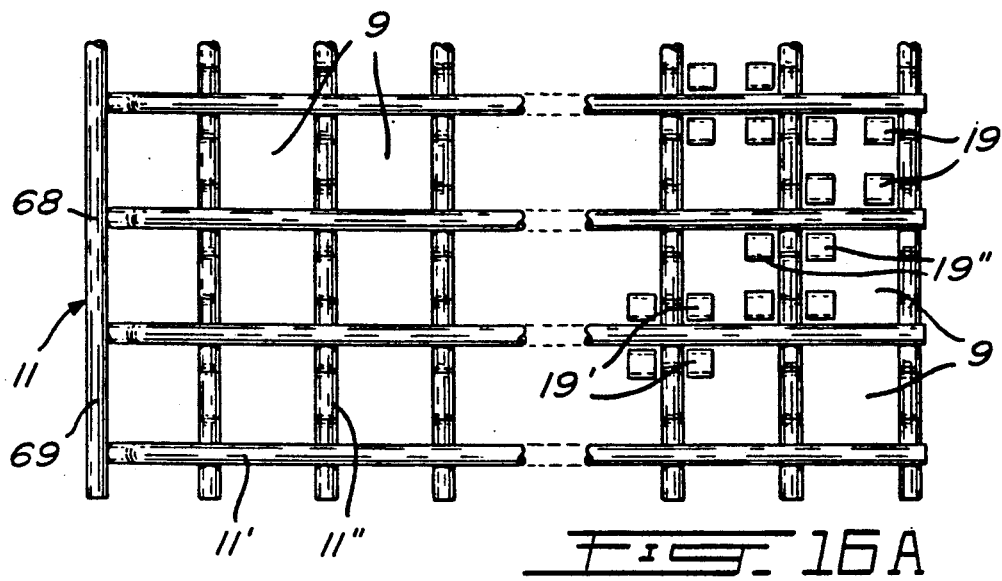
FIGS. 16A, 16B and 16C are plan, side and end views of the construction of the grating of the wheel chocking system of the present invention.
Figure 16C:
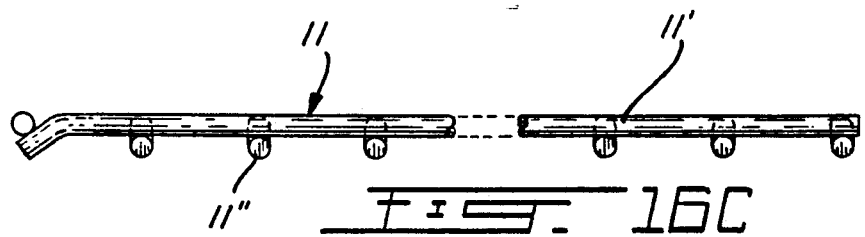
Figure 16B:
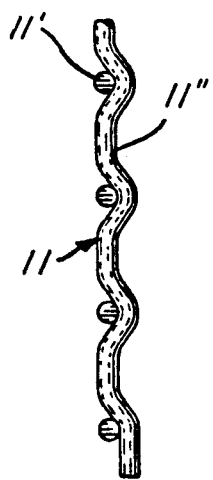
Figure 12:
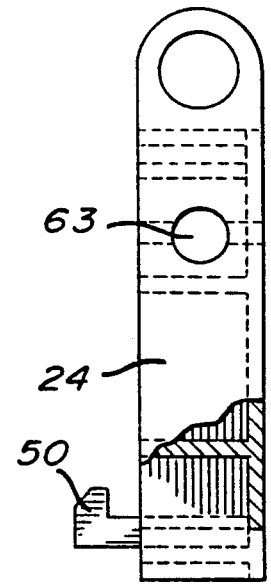
FIG. 12 is a partly fragmented side view showing the construction of the face plate of the chock of the wheel chocking system of the present invention.

A compressor disk 42, shown in FIGS. 10A and 10B, may also be secured to the rod 30 at a position substantially mid-length thereof. The compressor disk 42 consists of an annular disk having a bore 43 through which the rod 30 extends with keys 44 also projecting inwardly of the bore 43 for engagement with the channels 41 provided in the rod 30. A spring actuating pin 45 extends transversely across the compressor disk 42 for engaging a torsion spring 46 wound about the rod 30, as shown in FIGS. 3 and 4, and for a purpose which will be described later.

When the chock 16 of the present invention is engaged with the grating 11, it is positioned as shown in FIG. 2, with the manually actuated lever 31 extending forwardly to cause the hooking fingers 35 to engage with one of transverse rods 11'. In this position, the cam portions 32 are in the upper right quadrant of the cam engaging bore 37, urging the hooking fingers 35 forwardly as the cam latch 34 pivots on the hinge pin 36 as shown in FIG. 6A. The cam 38 is also inactive with the cam lifting edge 38' being positioned upwardly. If the tire of the wheel 14 is resting against the face plate 24, it applies a load against the load transfer member 26 and into the rear portion 21 of the chock member 16, with the studs 19 frictionally engaging the transverse rods 11'. Accordingly, in most instances, when the chock member 16 is loaded, it would be difficult to retract the chock from frictional engagement with the grating 11. However, with the lifter cam 38, this is easily accomplished in the following manner.

As shown in FIG. 6B, in order to disengage the chock, the manually actuated lever 31 is rotated counterclockwise in the direction of arrow 47, thereby rotating the rod 30 and the cam portions 32. This causes the cam portions 32 to be displaced in an arc relative to the center of the rod 30, toward the rear of the chock member 16 and induces the rod 30 to apply pressure against the straight edge portion 37' of the cam engaging bore 37, causing the cam latch 34 to rotate clockwise about its hinge pin 36, as shown in FIG. 6B. When the lever 31 reaches a substantially vertical position, the hooking fingers 35 are therefore moved out from under the transverse rods 11' and aligned within the openings 13 between the transverse rods 11', as shown in FIG. 6B. In this position, the cam lifting edge 38' of the cam 38 has been displaced and approaches the plane defined by the top surface of the transverse grating rods 11'. Also, at this location, the spring actuating pin 45 secured to the compressor disk 42 comes in contact with the torsion spring 46, as shown in FIG. 3. By further rotation of the lever 31 in the direction of arrow 48, as shown in FIG. 6C, the cam edge 38' frictionally engages one of the longitudinal rods 11" proximate only one of the lateral sides of the cam latch 34 (hence the desire to provide pairs of cams 38) and wedges the rear portion 21 of the chock upwards out of frictional engagement with the grating rod 11'. It should be noted that as longitudinal rods 11" have a waveform shape, the cam 38 is able to engage same at about the same vertical height is that of the top of the transverse rods 11'. The chock member 16 is thus disconnected from the grating 11 and can be removed.

As soon as the lever 31 is released, it moves back up to its vertical position, as shown in FIG. 6B, by the restoring force in the torsion spring 46. This torsion spring 46 and compressor disc 42 are not necessary for the operation of the lever 31, but are simply added features assisting the operator in properly orienting the system for installation. Thus, in the position shown in FIG. 6B, the chock member 16 is now ready to be installed again as the hooking fingers 35 are aligned with the arresting studs 19. This facilitates the future installation or storage of the chock member 16, so that the user need only to position the chock member 16 on the grating 11 and move the lever 31 clockwise to lock the chock member 16 thereto.

As shown in FIGS. 6A through 6C, the transverse rods 11' of the grating 11 extend transverse to the plane of the wheels of the ground vehicle positioned on the grating deck sections 12, or otherwise expressed, extend transversely to the longitudinal axis of the rectangular deck grating sections 12. The upper rods 11' and the lower rods 11" define therebetween rectangular openings 13 which receive the pairs of studs 19 and teeth 22 and constitute an engageable arresting means for the chock member 16. The hooking fingers 35 of the cam latch 34 have an arcuate shaped lower edge 35' leading to a recessed throat section 35", within which the transverse steel rods 11' are engaged. Note that the longitudinal dimension of the opening 13 is sufficient to accept a pair each of the studs 19, the teeth 22, or the hooking fingers 35 of the cam latch 34.

Referring again to the arresting studs 19, the clamping teeth 22 and the lifter cams 38, it can be seen how the chock member 16 can be removed from entrapment between the grating panels 11 and the tire of a wheel 14 or 14' that has shifted and come to rest against the chock face plate 24. The clamping teeth 22 cannot be disengaged from the rods 11 unless they move away from the tire, which is not possible while the arresting studs 19 are frictionally engaged, as noted above. If the lifter cams 38 are fully rotated, causing the arresting studs 19 to lift and disengage from the transverse rods 11', the chock member 16 can be pulled away from the tire, allowing the sloped clamping teeth 22 to slide out of engagement with the transverse rods 11' and thereby freeing the chock from entrapment.

Referring now to FIGS. 2, 11A, 11B, 12 and 13, the adjustability of the angulated face plate 24 may be understood. The load transfer member 26 is pivotally secured in a rear end thereof about the axially rotatable cam rod 30'. The load transfer members 26 have a gooseneck shape and define an angled front end chest portion 49. The face plate 24 is pivotally connected to a top end of the chest portion 49 by pivot pin 25. The face plate 24 is provided with a pair of engaging hook studs 50 spaced apart and projecting upwardly and away from the tire and located near a bottom edge of the plate 24. Each of these studs 50 engage a respective pair of a series of rectangular cavities 51 provided in the front face 53 of the load transfer wall 23, as shown in FIG. 11. The bottom edge of the plate 24 also rests on support ledges 51' disposed below the cavities 51.

The upward hook of the studs 50 and the support ledges 51', best shown in FIG. 11B, provide an important function in the dynamics of the control of the transported vehicle upon an impact. When a vehicle is impacted into the chock member 16, it tends to rise and through frictional contact between the tire and the top of the face plate 24 cause the face plate 24 to rotate such that the engagement studs 50 disengage from the cavities 51. The upward hook instead catches the upper edge of cavity 51, maintaining engagement. If the impact is sufficiently severe, the vehicle wheel can rise and then fall causing a downward load on the face plate through fictional contact with the tire, in turn severely stressing the studs 50 were it not for the support device provided by the ledges 51'.

As shown in FIG. 2, when the face plate 24 is at its lowest position 24', it is in direct contact with the load transfer wall 23 and a large portion of the load will be transferred directly to the base 18 with only a small portion of the load going into the gooseneck members 26. When the face plate 24 is positioned to its highest position in the top part of the load transfer wall 23, the load applied to the face plate 24 is distributed into both the load transfer gooseneck member 26 with a portion being distributed as well into the top part of the load transfer wall 23 and into the base 18 via the ribs 55. Arcs 52 indicate the displacement and the three positions of the face plate 24.

As previously mentioned, the angled face plate 24 is spring biased inwardly by a torsion spring assembly 28, as illustrated in FIGS. 2, 13A and 13B. The torsion spring assembly 28 consists of a torsion spring 60 wound about a free end of the pivot pin 25 outwardly of the paddle-shaped member 17 and retained captive thereon. The torsion spring 60 has an end 61 thereof restrained against a portion of the paddle-shaped member 17, whilst the other end 62 is restrained against a guide pin 63 which is engaged at its end 63' with the angled face plate 24. A guide slot 64 limits the forward displacement of the face plate 24 in the direction of arrow 27, as shown in FIG. 2. The central bottom edge of the face plate 24 may be further provided with a finger insertion slot to permit engagement and disengagement of the face plate with the load transfer plate.

The paddle-shaped member 17 is formed integral with a top portion of the gooseneck shaped member 26, as illustrated more clearly in FIG. 3, and has a smooth lateral restraining surface 66 which projects forwardly of one side of the face plate. This surface has a curved end 67 to provide a smooth surface for contact with the inner side walls of the tires of the wheels of the vehicle supported on the grating 11. The paddle 17 could also be secured to the base independent of the front wall 24 and not be vertically displaceable with the adjustable face plate 23.

As shown in FIGS. 2, 14, and 15, the grating 11 is formed by a series of elongated rectangular grating sections 12 which are closely spaced to define a narrow joint 65 therebetween and designed to be applied such that the spacing between cross bars is continuous throughout the length of the grating 11. These sections 12 are secured in spaced parallel relationship on each side of the deck of a transport vehicle, as illustrated in FIG. 1, and have a predetermined width to accommodate the wheels of all vehicles supported thereover and permit the chock members 16 to be secured to the grating 11 adjacent the wheels throughout the length of the deck. These grating sections 12 are secured to the support surface 65' of the transport vehicle by elongated hinge connectors 68 located on the outboard side of the transport vehicle. These hinge connectors 68 permit the grating section 12 to tilt upwardly, as shown in FIG. 15, to facilitate the removal of snow or other debris from the support surface 65' of the transport vehicle. Chain "tie" down channels 13 may be present on older transport vehicles and need not be removed to provide proper space for the grating section 12.

Another feature of the grating design is the wave shape of the lower rods whereby the upper surface of the wave is at the same elevation as the upper surface of the upper rods 11', thereby providing a trip-free surface for operator safety as well as continuous support for the tire treads, preventing the formation of tread indentation otherwise possible over extended transport periods.

As shown in FIGS. 17 to 20, the elongated hinge connectors 68 are provided by an elongated hinge base strip 69 and a hinge keeper strip 70 which is secured thereover by means of fasteners 71 which extend through the support surface 65'. The grating top rods 11' are bent at their end portions 72 and have a hinge pin 73 welded therealong and adjacent the free ends 74 thereof. This hinge pin 73 is retained captive in the trough portion 70' of the hinge keeper strip 70. These trough portions 70' are spaced apart along the strip 69, and each has a projecting tongue 70'' which is retained captive in a slot 69' provided in a hinge end portion 69'' of the hinge base strip 69. Accordingly, the base strip 69 and the hinge keeper strip 70 are assembled together about the hinge pin 73 of the deck sections and then secured within the surface 65' by fasteners 71. The hinge keeper strips 70 can be assembled such that each half engages the opposite half of the underlying hinge base strips 69, ensuring continuity in the spacing of the hinge system and the joints between grating sections 12 so that chock members 16 can be applied over the joints. As previously described, in order to clean debris on the support surface under the grating 11, the grating section 12 is lifted upwardly on its hinge pin 73 from its position of use as denoted by reference numeral 76 in FIG. 17 to its outwardly hinged position as denoted by reference numeral 77. Thus, it is easy to clean snow or debris from under the grating 11. Also, ice and snow clinging to the grating can be removed by impacting the grating sections 12 on the support surface 65.

Summarizing the advantages of the chocking system of the present invention, by the use of four light-weight chock members 16 proximate the four wheels of a vehicle, there is provided balanced restraint relative to the center of gravity of the vehicle supported on the grating 11, with the paddle-shaped members 17 positioned to extend along the inner side walls of the tires of the wheels 14, thus eliminating lateral shifting of the vehicle which is a major problem with chocking systems which are secured to wheels on a single side of a vehicle necessitating "tie down" means. Any scuff marks that may result, due to vehicle shifting, are also on the inside wall of the tire. As shown in FIG. 1, additional chock members 16 may be positioned on opposed sides of two or all four wheels, when securing very heavy vehicles, as illustrated at 16'. FIG. 1 also illustrates that vehicles having tandem wheels 14'' can still be secured.

Another very important characteristic of the present invention is the manner in which the chock member 16 is connected to the grating by simply placing the chock member 16 in position toward the tire in close proximity to the tire and simply rotating a lever 31. To disconnect the chock member 16, when it is loaded by the weight of the vehicle acting upon the face plate with the studs 19 in tight frictional contact against the rods 11 of the decking, it is merely necessary to rotate the lever in the opposite direction to its vertical position to disconnect the hooking fingers 35 from the top rods 11' of the decking and then to rotate the lever 31 further to put in motion the lifter cams 38, which wedge the studs 19 out of their frictional engagement in the decking. To reengage the chock member 16, the lever 31 is located vertically and it is then merely necessary for the user to push the chock into engagement and rotate the lever 31 in order to lock the chock back to the decking.

An important feature of the combination of the gooseneck shape in the load transfer member 26, and the angularity of the load transfer wall 23 and face plate 24, as well as its vertical adjustability, is that the entire assembly can be fitted against the tires of a wheel, extending high enough to restrain the vehicle in place while still clearing the lower body metal and ground effect projections normal on many automobiles.

FIG. 2 illustrates the characteristics achieved by the adjustability of the angled face plate 24. As previously described, it is not necessary to utilize restraining straps about the wheels with the chocking system of the present invention. The grating 11 also provides for a plurality of transversely aligned securement openings 13 so as to permit ¾ inch (1.9 cm) incremental chock adjustability both longitudinally and laterally. The chock member 16 of the present invention is also constructed of a structural plastics material, making it very lightweight compared to metal. Although only four chock member 16 are illustrated in FIG. 1, as previously described, it is envisaged that six or eight chock members 16 may be necessary for heavier vehicles. The construction and securement of the deck grating 11 makes the system easily and readily clearable of snow and debris.

Figure 21:
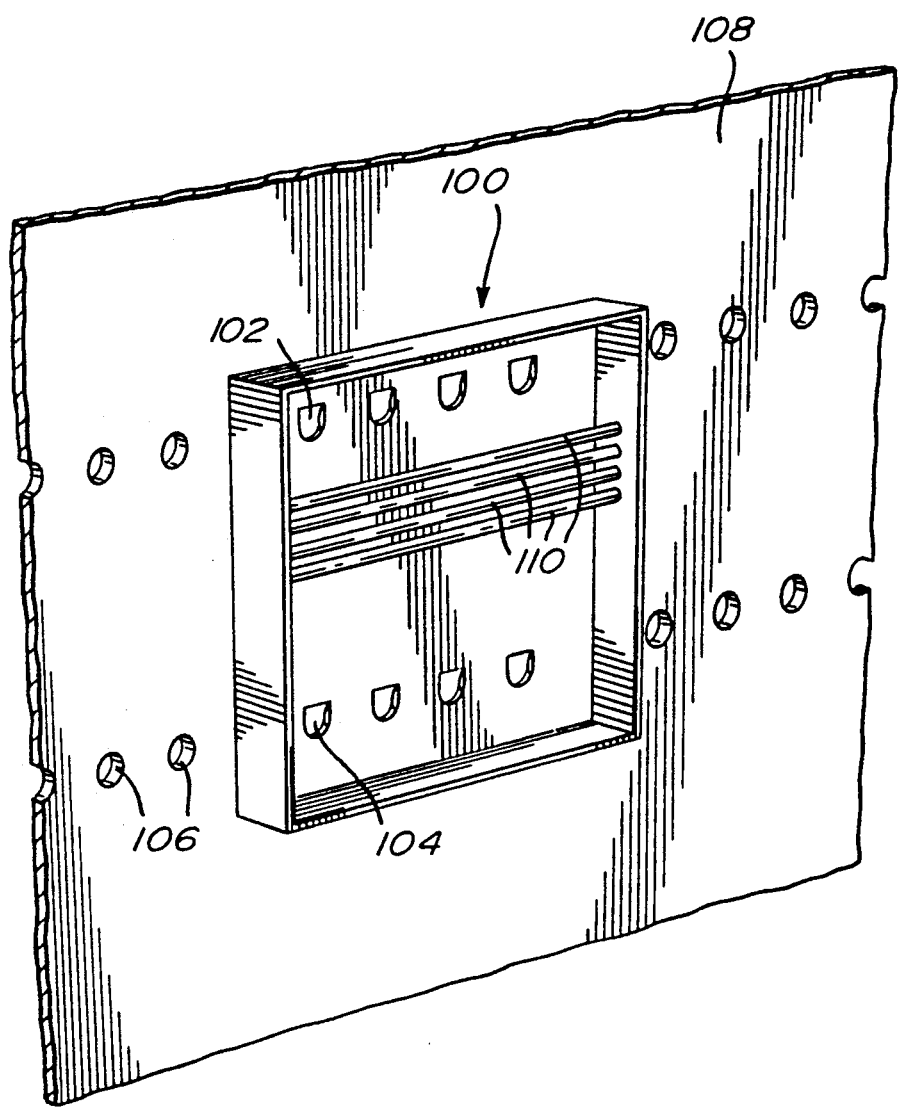
FIG. 21 is a perspective view of the storage panel for use with the chock of the wheel chocking system of the present invention. It should be understood that the drawings are not necessarily to exact scale and that certain aspects of the embodiments are illustrated by graphic symbols, schematic representations and fragmentary views. Actual embodiments or installations thereof may differ.

As seen in FIG. 21, storage panels 100 for storing the chock member 16 can be provided. These are stamped substantially flat metal plates. Along substantially parallel horizontal and vertical rows are tabs 102 which are positioned to slide into similarly arranged orifices 104 generally found in transport vehicle outboard walls 108.

When the tabs 102 are engaged with the orifices 106, the panel 100 can be simply pushed down into position. The tabs 102 retain thus the panel 100 in place. Note that locking tabs 106 are provided on the panel 100 to secure it to the wall 108. By use of a screwdriver or other tool, the originally planar locking tabs 106 can be bent to engage the orifice 108 and prevent vertical movement of the panel 100 relative to the wall 108. Removal is a reversal of this process. As can be seen, the panel 100 is further provided with upper and lower horizontal bars 110 and 112. To store the chock member 16, the studs 19 and teeth 22 are brought into engagement with one of the horizontal bars 110 and 112, respectively, with the chock member in a vertical orientation. Rotation of the lever 31 is thus sufficient, as noted above, to engage the fingers 35 of the cam latch 34 to the upper horizontal bars 110. Thus, the same action restraining the chock member 16 relative to the grating 11 may be used to restrain, in storage, the chock member 16 relative to the panel 100. Removal is as described above, by opposite rotation of the lever 31 and release of the hooking fingers 25 of the cam latch 34.

It is within the ambit of the present invention to cover any other obvious modifications of the preferred embodiment described herein provided such modifications fall within the scope of the appended claims.

What is claimed is:

1. A wheel chock for preventing rotation of a wheel on a supporting structure provided with a plurality of openings extending therethrough, the wheel chock comprising:

a base member having a front and a rear end;

clamping teeth comprised of a plurality of spaced apart arcuate appendages extending downwardly and forwardly from the base member front end for sliding insertion into the supporting structure openings and under the supporting structure in a direction toward the wheel and for sliding extraction from the supporting structure openings in a direction away from the wheel;

articulated locking means attached to the base member adjacent the rear end thereof, the articulated locking means comprising a hooking finger for insertion into and engagement with a supporting structure opening other than the supporting structure openings wherein the clamping teeth are inserted;

a plurality of arresting studs depending downwardly from the base member for insertion into the supporting structure openings other than the supporting structure openings wherein the clamping teeth are inserted to further prevent movement of the wheel chock; means coupled with the articulated locking means for engaging and disengaging the articulated locking means with the supporting structure openings to prevent and allow movement of the wheel chock, respectively; and face plate means supported by the base member for contact with the wheel to prevent rotation thereof.

2. The wheel chock of claim 1 wherein the engaging and disengaging means further comprises:

a lever having an engaged and disengaged position coupled with a rotatable rod having a cam portion thereon; and a cam latch plate hingedly mounted at an upper portion thereof to a hinge pin attached to the base member, the cam latch plate having a lower edge from which the hooking finger extends and a cam engaging bore through which the cam portion of the rotatable rod projects, such that rotation of the cam portion rotates the cam latch plate about the hinge pin;

the lever, when rotated to its engaged position, rotating the cam portion of the rotatable rod to engage the hooking finger of the cam latch plate with the supporting structure openings, and the lever, when rotated to its disengaged position, rotating the cam portion of the rotatable rod to disengage the hooking finger of the cam latch plate from its supporting structure opening.

3. The wheel chock of claim 2 wherein the lever further has a lift position whereat the hooking finger of the cam latch plate is disengaged from its supporting structure opening, the wheel chock further comprising a means for extracting the articulated locking means, the extracting means including a lifter cam rotatably coupled with the rotatable rod;

the lever, when rotated to the lift position, causing the lifter cam to protrude below the base member and contact the supporting structure to urge the base member rear end above the supporting structure such that the hooking finger and the arresting studs are extracted from their supporting structure openings, permitting the chock to be pulled away from the supporting structure, and the clamping teeth to be extracted from under the supporting structure openings in the direction away from the wheel.

4. The wheel chock of claim 3 further comprising a compressor element coupled to the rotatable rod and engaging a resilient member when the lever is pivoted to the lift position, the resilient member applying a rotational force to the rotatable rod to bias the lever to the disengaged position when the lever is released, thereby rotating the lifter cam to a retracted position relative the supporting structure and allowing the hooking finger and arresting studs to re-engage their supporting structure openings.

5. A wheel chock for preventing rotation and shifting motion of a wheel on a supporting structure having a plurality of openings extending therethrough, the wheel chock comprising:

a base member having a front and a rear end;

a plurality of spaced apart clamping teeth extending downwardly and forwardly from the base member front end for sliding insertion into the supporting structure openings and under the supporting structure in a direction toward the wheel and for sliding extraction from the supporting structure openings in a direction away from the wheel;

articulated locking means attached to the base member adjacent the rear end thereof, the articulated locking means comprising a hooking finger for insertion into and engagement with a supporting structure opening other than the supporting structure openings wherein the clamping teeth are inserted;

a plurality of arresting studs depending downwardly from the base member for insertion into the supporting structure openings other than the supporting structure openings wherein the clamping teeth are inserted to further prevent movement of the wheel chock;

means for engaging and disengaging the hooking finger relative the supporting structure opening to prevent and allow movement of the wheel chock, respectively;

face plate means supported by the base member for contact with the wheel to prevent rotation thereof; and restraining means extending from the face plate means for contact with the wheel to prevent shifting motion thereof.

6. The wheel chock of claim 5, wherein a load transfer wall is integrally formed with the base member front end and the face plate means further comprises:

a load transfer member having an articulated first end hingedly connected to the base member rear end and an articulated second end hingedly connected to a face plate;

inclination adjustment studs connected to the face plate; and a plurality of vertically arranged openings on the load transfer wall of the base member front end;

the load transfer wall openings receiving the inclination adjustment studs to adjust the vertical position of the face plate in contact with the wheel relative the supporting surface.

7. The wheel chock of claim 5 wherein the engaging and disengaging means further comprises:

a lever having an engaged and disengaged position coupled with a rotatable rod having a cam portion thereon; and a cam latch plate hingedly mounted at an upper portion thereof to a hinge pin attached to the base member, the cam latch plate having a lower edge from which the hooking finger extends and a cam engaging bore through which the cam portion of the rotatable rod portions, such that rotation of the cam portion rotates the cam latch plate about the hinge pin;

the lever, when rotated to its engaged position, rotating the cam portion of the rotatable rod to engage the hooking finger of the cam latch plate with the supporting structure opening, and the lever, when rotated to its disengaged position, rotating the cam portion of the rotatable rod to disengage the hooking finger of the cam latch plate from its supporting structure opening.

8. The wheel chock of claim 7 wherein the lever further has a lift position whereat the hooking finger of the cam latch plate is disengaged from its supporting structure opening, the wheel chock further comprising a means for extracting the articulated locking means, the extracting means including a lifter cam rotatably coupled with the rotatable rod;

the lever, when rotated to the lift position, causing the lifter cam to protrude below the base member and contact the supporting structure to urge the base member rear end above the supporting structure such that the hooking finger and the arresting studs are extracted from their supporting structure openings, permitting the chock to be pulled away from the supporting structure, and the clamping teeth to be extracted from under the supporting structure openings in the direction away from the wheel.

9. The wheel chock of claim 8 further comprising a compressor element coupled to the rotatable rod and engaging a resilient member when the lever is pivoted to the lift position, the resilient member applying a rotational force to the rotatable rod to bias the lever to the disengaged position when the lever is released, thereby rotating the lifter cam to a retracted position relative the supporting structure and allowing the hooking finger and arresting studs to re-engage their supporting structure openings.

10. A wheel chock for preventing rotation and shifting motion of a wheel on a supporting structure having a plurality of openings extending therethrough, the wheel chock comprising:

a base member having a front and a rear end and a load transfer wall integrally formed with the base member front end;

a plurality of spaced apart clamping teeth extending downwardly and forwardly from the base member front end for sliding insertion into the supporting structure openings and under the supporting structure in a direction toward the wheel and for sliding extraction from the supporting structure openings in a direction away from the wheel;

articulated locking means attached to the base member adjacent the rear end thereof, the articulated locking means comprising a hooking finger for insertion into a supporting structure opening other than the supporting structure openings wherein the clamping teeth are inserted and for engagement under the supporting structure proximate the supporting structure opening;

a plurality of arresting studs depending downwardly from the base member for insertion into the supporting structure openings other than the supporting structure openings wherein the clamping teeth are inserted;

means for engaging and disengaging the hooking finger relative its supporting structure opening to prevent and allow movement of the wheel chock, respectively, the engaging and disengaging means further comprising a lever having an engaged and disengaged position coupled with a rotatable rod having a cam portion thereon, and a cam latch plate hingedly mounted at an upper portion thereof to a hinge pin attached to the base member, the cam latch plate having a lower edge from which the hooking finger extends and a cam engaging bore through which the cam portion of the rotatable rod projects, such that rotation of the cam portion rotates the cam latch plate about the hinge pin, the lever, when rotated to its engaged position, rotating the cam portion of the rotatable rod to engage the hooking finger of the cam latch plate with its supporting structure opening, and the lever, when rotated to its disengaged position, rotating the cam portion of the rotatable rod to disengage the hooking finger from its supporting structure opening;

the lever further having a lift position whereat the hooking finger is disengaged from its supporting structure opening and the chock further having a means for extracting the articulated locking means, the extracting means including a lifter cam rotatably coupled with the rotatable rod;

the lever, when rotated to the lift position, causing the lifter cam to protrude below the base member to contact the supporting structure and urge the base member rear end above the supporting structure such that the hooking finger and the arresting studs are extracted from their supporting structure openings, permitting the chock to be pulled away from the supporting structure and the clamping teeth to be extracted from under the supporting structure openings in the direction away from the wheel;

a compressor element coupled to the rotatable rod and engaging a resilient member when the lever is pivoted to the lift position, the resilient member applying a rotational force to the rotatable rod to restore the lever to the disengaged position when the lever is released, thereby rotating the lifter cam to a retracted position and allowing the hooking finger and arresting studs to re-engage their supporting structure openings;

face plate means supported by the base member for contact with the wheel to prevent rotation thereof when the lever is in the engaged position, the face plate means further comprising a load transfer member having an articulated first end hingedly connected to the base member rear end and an articulated second end hingedly connected to a face plate, inclination adjustment studs connected to the face plate, and a plurality of vertically arranged openings on the load transfer wall of the base member front end, the load transfer wall openings receiving the inclination adjustment studs to adjust the vertical position of the face plate in contact with the wheel relative the supporting structure; and restraining means extending from the face plate means for contact with the wheel to prevent shifting motion thereof when the lever is the engaged position.

11. The wheel chock of claim 10 wherein the base member rear end has an end surface and the plurality of arresting studs projecting below the base member are parallel to the end surface of the base member rear end, the arresting studs being configured for insertion through the supporting structure openings to further prevent movement of the wheel chock.

12. The wheel chock of claim 6 wherein the face plate is spring biased against the lad transfer wall by a torsion spring positioned about a hinge rod, the torsion spring engaging a guide pin integral with and projecting from the face plate, the guide pin being restricted to motion within an arcuate guide slot formed in the load transfer member to maintain engagement of the adjustment studs with the load transfer wall openings.

13. The wheel chock of claim 12 wherein the face plate means is provided with an undercut opening in a lower edge thereof defining a hand gripping cavity to facilitate manual rotation of the face plate to permit disengagement of the adjustment studs from the load transfer wall openings.

14. The wheel chock of claim 7 in combination with a supporting structure further comprising a series of rectangular panels;

each panel being secured to a substructure having two longitudinal sides by an elongated hinge connector fixedly attached to the substructure and permitting the panels to be pivoted above the substructure, and each panel comprising a plurality of circular rods arranged in a transverse direction and a longitudinal direction, each of the rods in the transverse direction being evenly spaced in parallel relation and each of the rods in the longitudinal direction being evenly spaced in parallel relation, the rods in the transverse direction being perpendicular and attached to the rods in the longitudinal direction to define the supporting structure openings therebetween; and the rods in the transverse direction being located above the rods in the longitudinal direction providing a space under the rods in the transverse direction for engagement by the clamping teeth and the hooking finger.

15. The combination of claim 14 wherein the hooking finger further comprises an arcuately shaped lower edge leading to a recessed throat section in which the rods in the transverse direction may be received captive by a wedging action of the cam portion and cam engaging bore of the cam latch plate.

* * * * *

UNITED STATES PATENT AND TRADEMARK OFFICE
CERTIFICATE OF CORRECTION

PATENT NO.  : 5,302,063
DATED       : April 12, 1994
INVENTOR(S) : Robert B. Winsor It is certified that error appears in the above-indentified patent and that said Letters Patent is hereby corrected as shown below:

Column 13, Line 3, "portions" should be --projects--; and

Column 15, Line 11, Claim 12, "lad" should be --load--.

Signed and Sealed this

Sixteenth Day of August, 1994

*Attest:*

BRUCE LEHMAN

*Attesting Officer*  *Commissioner of Patents and Trademarks*